(12) United States Patent
Berrux et al.

(10) Patent No.: US 8,851,319 B2
(45) Date of Patent: Oct. 7, 2014

(54) COOKING ARTICLE INCLUDING AN EXTERNAL POLYIMIDE-BASED COATING

(75) Inventors: Aurélien Berrux, Chambery (FR); Pierre-Jean Muller, Saint Felix (FR); Jean-Luc Perillon, Saint Paul Trois Chateaux (FR)

(73) Assignee: SEB SA, Ecully (FR)

( * ) Notice: Subject to any disclaimer, the term of this patent is extended or adjusted under 35 U.S.C. 154(b) by 1078 days.

(21) Appl. No.: 12/340,306

(22) Filed: Dec. 19, 2008

(65) Prior Publication Data

US 2009/0159601 A1   Jun. 25, 2009

(30) Foreign Application Priority Data

Dec. 21, 2007   (FR) ...................................... 07 60268

(51) Int. Cl.
*A47J 27/00*   (2006.01)
*H05B 6/12*   (2006.01)
*A47J 36/02*   (2006.01)

(52) U.S. Cl.
CPC ................ *A47J 36/02* (2013.01); *A47J 36/025* (2013.01)
USPC ...................... 220/573.1; 219/621; 220/573.2; 428/458; 428/473.5; 428/653

(58) Field of Classification Search
USPC ............. 219/621; 220/573.1, 573.2; 428/458, 428/473.5, 653
See application file for complete search history.

(56) References Cited

U.S. PATENT DOCUMENTS 3,742,174 A * 6/1973 Harnden, Jr. .................. 219/627
3,742,178 A * 6/1973 Harnden, Jr. .................. 219/627
3,745,290 A * 7/1973 Harnden et al. ............... 219/621
3,777,094 A * 12/1973 Peters, Jr. ...................... 219/621
3,837,895 A 9/1974 Pryor et al. ....................... 117/70
3,884,868 A * 5/1975 Trice et al. ..................... 524/413
3,966,426 A * 6/1976 McCoy et al. ................. 428/653
4,784,732 A * 11/1988 Covino ........................... 205/106
5,545,439 A * 8/1996 Deng et al. ..................... 427/327
2004/0229079 A1* 11/2004 Groll .............................. 428/653
2006/0251837 A1* 11/2006 Cnossen et al. .............. 428/35.7

FOREIGN PATENT DOCUMENTS

DE   7 200 907   8/1972
DE   7 304 403   6/1973
FR   2 114 104   6/1972

OTHER PUBLICATIONS

Machine translation of DE 7200907 (2011).*
Machine translation of DE 7304403 (2011).*
Machine translation of FR 2114104 (2011).*
Rapport De Recherche Préliminaire of French Application No. 0760268 mailed Jul. 18, 2008.

* cited by examiner

*Primary Examiner* — Callie Shosho
*Assistant Examiner* — John Freeman
(74) *Attorney, Agent, or Firm* — Seyfarth Shaw LLP; Brian Michaelis

(57) ABSTRACT

This invention relates to a cooking article (1) including a metal dish (2) having a base area (20), a concave internal face (21) intended to be arranged on the side of the food to be placed in said article (1) and a convex external face (22) intended to be arranged toward a heat source, and an external coating (3) covering said external face (22), characterized in that said external coating (3) includes between 30% and 50% by weight, with respect to the entire weight of said coating (3), of at least one polyimide having a glass transition temperature Tg equal to or above 250° C. This invention also relates to a process for producing such an article (1).

14 Claims, 1 Drawing Sheet

COOKING ARTICLE INCLUDING AN EXTERNAL POLYIMIDE-BASED COATING

FIELD

This invention relates to a cooking article including a support of which the convex external face is provided with an external polyimide-based coating, which has improved resistance to certain detergents such as those used in dishwashers, high flame resistance and high adhesion to an anodized support.

Cooking articles with external coatings based on paints (polyurethane-, polyester-, silicone-based, etc.) are known from the prior art. These coatings nevertheless have limited resistance to detergent formulations typically used in dishwashers, as well as low flame resistance.

Other types of external coatings are also known from the prior art, such as, for example, sol-gel coatings obtained from organometallic precursors (for example metal alkoxides). These coatings are applied in a thin layer by sol-gel route. Such coatings can be applied on anodized surfaces, but their lifetime on these surfaces is limited, due to their low thickness (inherent to the nature of the coating) and due to the difficulty of maintaining good adhesion over the lifetime of the product.

Moreover, there are more conventional techniques for depositing coatings on anodized surfaces, such as water sealing or sealing with nickel or cobalt salts. However, these sealing techniques do not enable coatings with a sufficient resistance to the detergents used in dishwashers to be produced.

SUMMARY

This invention therefore relates to a cooking article and a process for producing such an article that overcome the disadvantages of the prior art, by forming, on the external face of the article, an external polyimide-based coating having improved resistance to certain detergents such as those used in dishwashers, high flame resistance and high adhesion to an anodized support.

More specifically, this invention relates to a cooking article including a metal dish having a base area, a concave internal face intended to be arranged on the side of the food to be placed in said article and a convex external face intended to be arranged toward a heat source, and an external coating at least partially covering said external face.

According to the invention, said external coating includes between 30% and 50% by weight, with respect to the entire weight of said coating, of at least one polyimide having a glass transition temperature Tg equal to or above 250° C.

By glass transition temperature Tg, we mean, in the sense of this invention, the temperature below which it becomes rigid and brittle, and can crack or break into pieces.

The external coating of the invention has the advantage of having good adhesion properties on a metal support (in particular on an aluminum or aluminum alloy support, even if the latter is anodized), as well as sufficient imperviousness to resist to repeated exposure to hot and alkaline conditions such as, for example, those encountered in a dishwasher, and finally sufficient hardness to avoid markings during use, including under conditions of use during cooking.

The external coating of the cooking article according to the invention also enables the cleaning of the article to be facilitated. These effects are even more marked when the dish is made of an anodized aluminum alloy or aluminum.

Preferably, the external coating has a thickness between 5 µm and 40 µm.

Below 5 µm, the imperviousness of the coating is inadequate, while above 4 µm, the external coating according to the invention has appearance defects (color, orange peel, or even a loss of the silky appearance of the anodized surface if the external face of the support is made of an anodized aluminum alloy or aluminum) incompatible with mass distribution, aside from the disadvantage of requiring many layers in order to obtain a thickness of at least 40 µm (which moreover considerably increases the cost of such a coating).

Advantageously, the external coating of the article according to the invention can also include at least one filler and/or at least one pigment.

As fillers that can be used in the external coating according to the invention, silica, alumina, corundum, clays, quartz, and mixtures thereof are recommended.

The lower the amount of polyimide in the coating is, the greater the possibility of adding fillers in the coating. Thus, a small amount of polyimide (in particular, close to 30%) corresponds to a large amount of filler, which enables a hard external coating to be obtained. However, if the amount of polyimide is too low, the imperviousness of the coating is no longer guaranteed. By contrast, the larger the amount of polyimide in the coating is (in particular close to 49-50%), the greater the tendency will be for the external polyimide-based coating to be transparent and to have a lower hardness. High transparency is not really desirable when seeking to imitate the appearance of anodized aluminum.

As pigments that can be used in the external coating according to the invention, titanium dioxide, iron (II) oxide (FeO), iron (II) oxide ($Fe_2O_3$), carbon black, perylene red, metal flakes, mixed cobalt and manganese oxides and mixtures thereof are recommended.

Advantageously, the external coating of the article according to the invention can also include additives chosen from anti-sedimentation agents, surface control additives and wetting agents.

Advantageously, the external face of the support is made of aluminum or an aluminum alloy, preferably an anodized aluminum alloy or aluminum.

Only a portion of the external face of the support can be made of aluminum or an aluminum alloy, anodized or not, and the other portion can include a different material, for example a material compatible with induction heating.

Thus, according to a first particularly advantageous embodiment of this invention, the cooking article according to the invention includes an attached base compatible with induction heating, which is arranged under (against) the external face of the dish, locally in the area of the base, so that the cooking article is rendered compatible with induction heating.

As a material compatible with induction heating, ferritic materials, and in particular ferritic stainless steels are recommended.

This invention also relates to a process for producing a cooking article including the following steps:

a) providing a metal dish with a base area, a concave internal face intended to be arranged on the side of the food to be placed in the article and a convex external face intended to be arranged toward a heat source, b) preparing a polyimide resin composition including:
 i. the mixture of the following compounds:
 at least 20% by weight of at least one polyimide resin with respect to the total weight of said composition,
 0 to 30% by weight of one or more organic solvents with respect to the total weight of said composition,
 0 to 60% by weight of one or more fillers with respect to the total weight of said composition, 0 to 20% by weight of one or more pigments with respect to the total weight of said composition, 0 to 5% by weight of one or more additives; then ii. the formulation of said mixture in the form of a solution in at least the solvent, in order to obtain the polyimide resin composition;

c) applying, on the external face of the dish, at least one layer of said polyimide composition, which has a thickness before baking of between 10 and 20 μm, in which the polyimide composition layer at least partially covers the external face of the support;

d) baking said polyimide composition layer at a temperature of between 300° C. and 420° C., for a period between 7 and 45 minutes, in order to obtain the external coating.

Below a baking temperature of 300° C., an external coating is obtained which has lower performance in terms of chemical resistance and adhesion to the support (in this case, the external face of the dish).

The best performances are obtained when the polyimide composition is baked at a temperature on the order of 350° C.

According to a first embodiment of the invention, the dish is made of aluminum or an aluminum alloy.

According to a second embodiment of the invention, the dish is obtained by drawing a bilaminate including a stainless steel layer intended to form the internal face of the article (or the dish) and an aluminum or aluminum alloy layer, anodized or not, which is intended to form the external face of the article (or the dish).

As solvents that can be used in the formulation of the polyimide composition of the invention, the following solvents can be cited in particular: N-methylpyrrolidone (NMP), cyclohexanone, γ-butyrolactone, chloroform, tetrachloroethane, tetrahydrofurane (THF), dioxane, dimethylformamide (DMF), dimethylacetamide (DMAC), m-cresol, and their mixtures.

Preferably, one to three layers of polyimide composition according to the invention are applied in order to form the external polyimide-based coating.

Advantageously, the process of the invention also comprises a step of preparing the surface of the external face of the dish, which surface preparation step precedes the step of applying a polyimide composition layer on the external face of the dish. This surface preparation is preferably a mechanical surface treatment step, which can be performed for example by sanding or bead blasting.

According to an advantageous embodiment of this invention, the process of the invention also comprises, between the step of preparing the surface of the external face of the support and the step of applying a polyimide composition layer, a step of applying (for example by forging), on the external face of the dish, a plate intended to partially cover the base area, which plate is made of a metal or a metal alloy compatible with induction heating.

As a material compatible with induction heating, ferritic materials and in particular ferritic stainless steels are recommended.

Advantageously, the process of the invention also comprises a step of producing an anti-adhesive coating on the internal face of the dish, which precedes the application of the polyimide composition layer on the external face of the dish, and which, as the case may be, follows the step of preparing the surface of the external face of the dish.

The anti-adhesive coating can advantageously be made by applying an anti-adhesive composition on the internal face of the dish, followed by baking thereof.

Depending on the nature of the anti-adhesive coating, the baking is performed at a temperature of between 370° C. and 420° C. if the anti-adhesive coating includes at least one fluorocarbon resin, or between 200° C. and 500° C. if the anti-adhesive coating composition is a sol-gel composition including at least one metal alkoxide (for example alkoxysilane) or a composition including at least one silicone resin.

BRIEF DESCRIPTION OF THE DRAWINGS

Other advantages and special features of this invention will become clear from the following description, provided by way of a non-limiting example and in reference to the appended figures.

The same elements shown in FIGS. 1 and 2 are identified by the same numeric references.

DETAILED DESCRIPTION

Figure 1:
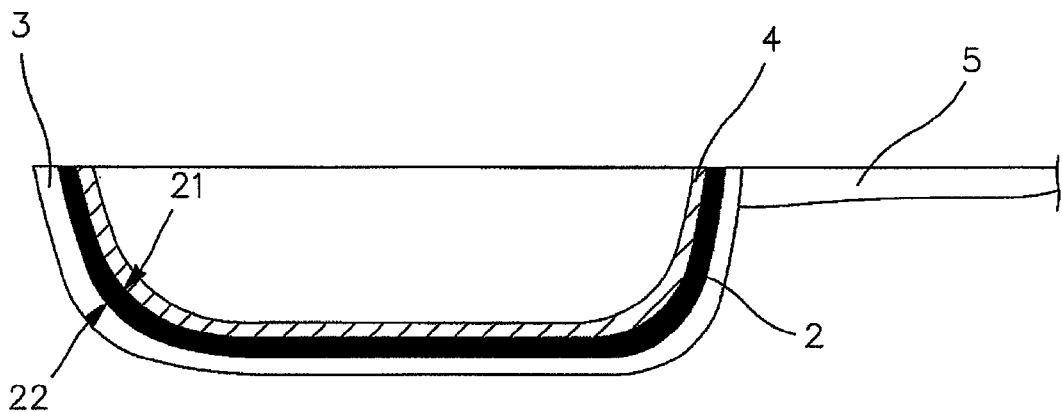
FIG. 1 shows a diagrammatic cross-section view of a cooking article according to the invention according to a first alternative embodiment.
Figure 2:
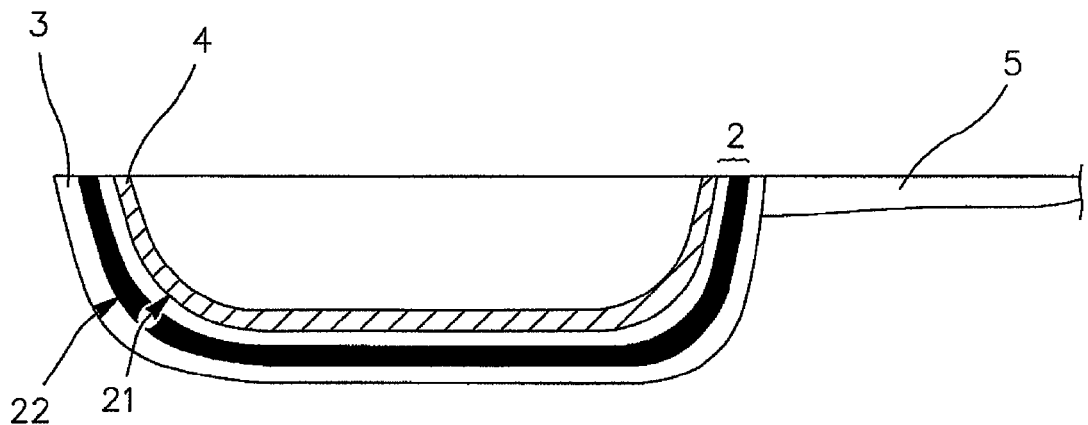
FIG. 2 shows a diagrammatic cross-section view of a cooking article of the invention according to a second alternative embodiment.
Figure 3:
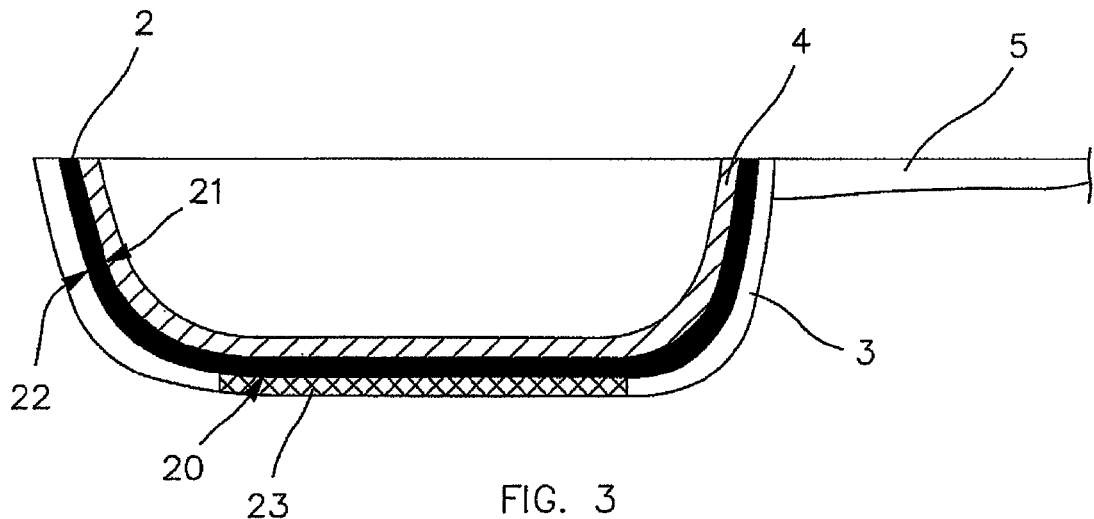
FIG. 3 shows a diagrammatic cross-section view of a cooking article according to the invention according to a third alternative embodiment.

In FIGS. 1 to 3, a pan 1 is shown by way of an example of a cooking article according to the invention. The pan 1 includes a metal support in the form of a hollow dish 2, and a gripping handle 5.

The dish 2 includes an internal face 21, which is the face on the side of the food to be received in the pan 1, and an external face 22, which is intended to be arranged toward an external heat source. The external face 22 is coated with an external polyimide-based coating 3, according to the invention.

For the alternative embodiments shown in FIGS. 1 and 2, the external face 22 is integrally coated by the external coating 3, while, for the alternative embodiment shown in FIG. 3, it is coated only partially, while the portion not covered by the external coating 3 is coated by a plate 23 compatible with (enabling) induction heating.

For the alternative embodiment shown in FIG. 1, the metal dish 2, serving as a support, is made entirely of aluminum or an aluminum alloy, preferably anodized.

Among the aluminum alloys capable of being used to produce the dish, the following are recommended:

1XXX series aluminum: alloys 1050, 1100, 1200 and 1350 ("pure" aluminums with 99% of aluminum);

3XXX series aluminum and manganese alloys: alloys 3003, 3004, 3205 and 3005;

5XXX series aluminum and magnesium alloys: alloys 5005, 5050 and 5052;

6XXX series aluminum, silicon and magnesium alloys: alloys 6053, 6060, 6063, 6101 and 6951, in which the 1XXX, 3XXX, 5XXX and 6XXX series mentioned above come from the classification of aluminum alloys established by the Aluminum Association, Inc.

The alternative shown in FIG. 2 differs from that shown in FIG. 1 in that the dish 2 is not integrally formed by aluminum (or aluminum alloy, optionally anodized): only the external face 22 is made of aluminum or aluminum alloy, anodized or not, while the internal face 21 is for example made of stainless steel.

The alternative shown in FIG. 3 differs from those shown in FIGS. 1 and 2 in that an attached base 23 compatible with induction heating is arranged under the dish 2 and intimately connected thereto, locally in the area of its base 20. This attached base 23 is made of a material compatible with induction heating, which can be chosen from the ferromagnetic materials, and preferably from ferritic stainless steels.

For the three alternative embodiments, shown respectively in FIGS. 1 to 3, the internal face 21 is coated with an anti-adhesive coating 4, of which the thickness is advantageously between 30 and 45 μm. Such an anti-adhesive coating 4 can be a coating including at least one thermostable resin resistant to a temperature of at least 200° C. or a coating consisting of a sol-gel material.

The thermostable resin, resistant to a temperature of at least 200° C. is advantageously a fluorocarbon resin, which is preferably chosen from polytetrafluoroethylene (PTFE), a tetrafluoroethylene and perfluoropropyl-vinylether copolymer (PFA), a tetrafluoroethylene and hexafluoropropylene copolymer (PEP) and mixtures thereof (in particular a mixture of PTFE and PFA).

EXAMPLES

Products

Polyimide Resin:
Resin sold by HUNTSMAN under the trade name MATRIMID 5218
Solvents:
N-methylpyrrolidone (NMP)
Cyclohexanone
Fillers:
Q 800: quartz having a particle size below 7 μm
Wetting and Spreading Agents:
acrylic polymer sold by the Evonik company under the trade name Tegoflow ZFS 460
fatty acid derivative sold by the Evonik company under the trade name TD610
Pigments
iron oxide sold under the trade name H860 by the PEMCO company
spinel-type black pigment sold under the trade name N 100 by the PEMCO company
titanium dioxide sold under the trade name RN 56 by the Kronos company
Tests
Flame Resistance
The external coating of the cooking article is exposed to the flame of a Bunsen burner for 20 minutes. It is then cooled by soaking in cold water.
Adhesion
The adhesion of the external coating to its support (in this case on the external face of the dish) is evaluated by a cross-cut adhesion test according to standard ISO 2409, followed by immersion for 3 hours in water.
Resistance to Dishwasher Detergents
The article is exposed to complete dishwashing cycles at 55° C. in the presence of a commercial detergent such as the product sold under the trade name "Cascade" by Procter and Gamble.

Example 1

Production of an External Polyimide Resin-Based Coating Composition According to the Process of the Invention We produced a polyimide resin composition according to the process of the invention by mixing the following constituents (in parts by weight pp):

MATRIMID 5218 polyimide resin: 9.79 pp
solvents
    NMP: 69.74 pp
Cyclohexanone: 14.28 pp
H 860 iron oxide: 14.28 pp
Tegoflow ZFS 460 wetting and spreading agent: 0.34 pp
TegoDispers 610 wetting and spreading agent: 0.65 pp
N 100 black pigment: 3.25 pp
Q 800 quartz: 0.98 pp
RN 56 titanium dioxide: 0.58

Example 2

Production of an Example of a Cooking Article According to the Invention

As a support, we used an aluminum dish obtained by forming a 1200-type aluminum disk, in which the dish thus formed has a base of which the diameter is around 26 cm. This dish is then anodized. Then, by means of an air gun, a first layer of the polyimide resin composition of example 1 is applied on said anodized aluminum dish in order to obtain a layer with a wet thickness of 20 μm. This layer is then dried at 200° C. Then, a second layer of the polyimide resin composition of example 1, also with a wet thickness of 20 μm is applied, and then dried at 200° C. The dish thus coated is then baked at 300° C. for 30 minutes, after which an external coating with a final thickness of 20 μm is obtained.

The adhesion of the external coating thus formed is evaluated according to the adhesion test mentioned above. The external coating does not show any detachment.

The flame resistance of this coating is also evaluated according to the flame resistance test mentioned above. There is no change in appearance.

Finally, a dish thus coated is subjected to 50 dishwashing cycles according to the process described above. At the end of the test, the dish does not show any traces of hydrolysis or stress: in particular, it preserves its gray color.

Example 3

Comparative Example

Production of an External PTFE-Based Coating

An external PTFE-based coating is produced by the successive application of three layers of a primer PTFE-based composition, each having a wet thickness of 15 microns. After an intermediate drying at 120° C. and a step of baking of the assembly at 415° C. for 7 minutes, an external PTFE-based coating is obtained with a wet thickness of 20 μm.

The primary PTFE-based composition is indicated below:

TABLE 1

| Composition of the primer layer | Parts by weight |
| --- | --- |
| Aqueous dispersion of polyamide-imide at around 10% dry extract | 37.1 |
| N. Methylpyrrolidone | 6.5 |
| Spreading and film-forming agents (14% in water) | 4 |
| PTFE dispersion at 60% dry extract | 21.2 |
| Colloidal silica at 30% dry extract | 13.9 |
| Carbon black at 25% dry extract | 2.8 |
| Water | 14 |
| NaOH (d = 0.9) | 0.5 |

However, the flame resistance test shows white areas on the parts in contact, and the dishwashing resistance is inadequate due to the porosity of the PTFE, which causes blistering or discoloration of the anodized surface under the PTFE coating.

Example 4

Production of an Example of a Cooking Article According to the Invention

As a support, we used an aluminum dish obtained by forming a 1200-type aluminum disk, in which the dish thus formed has a base of which the diameter is around 26 cm. This dish is then anodized. A ferritic stainless steel base is attached to the dish so as to give it magnetic properties. An air gun is used to apply, to the skirt of said dish, the polyimide resin composition of example 1 in order to obtain a layer having a wet thickness of 12 μm. This layer is then dried at 200° C. Then, a second layer of said polyimide resin is applied with a wet thickness of 10 μm and then dried at 200° C. The dish thus coated is then baked at 300° C. for 30 minutes in order to produce a coating having a final thickness (after baking) of 10 μm.

The adhesion of the external coating thus formed is evaluated according to the adhesion test mentioned above. The external coating does not show any detachment.

The flame resistance of this coating is also evaluated according to the flame resistance test mentioned above. There is no change in appearance.

Finally, a dish thus coated is subjected to 50 dishwashing cycles according to the process described above. At the end of the test, the dish does not show any traces of hydrolysis or stress: in particular, it preserves its gray color.

The invention claimed is:

1. A cooking article comprising:
    a bilaminate metal dish having a base area, a concave internal face formed by a layer of stainless steel and arranged on a side of said bilaminate metal dish where food is to be placed in said article, and a convex external face formed by a layer of anodized aluminum or anodized aluminum alloy,
    an external coating covering said convex external face, and
    said external coating including between 30% and 50% by weight, with respect to the entire weight of said external coating, of at least one polyimide having a glass transition temperature equal to or above 250° C.

2. The cooking article according to claim 1, characterized in that said external coating has a thickness of between 5 μm and 40 μm.

3. The cooking article according to claim 1, further comprising an attached base compatible with induction heating, which is arranged under said bilaminate metal dish, locally in the area of said base area.

4. The cooking article according to claim 3, characterized in that said attached base is made of a material compatible with induction heating.

5. The cooking article according to claim 1, characterized in that said external coating includes at least one of a filler and a pigment.

6. The cooking article according to claim 5, characterized in that said filler is a mineral filler selected from the group consisting of silica, alumina, corundum, clays, quartz, and mixtures thereof.

7. The cooking article according to claim 5, characterized in that said pigment is selected from the group consisting of titanium dioxide, iron (II) oxide (FeO), iron (III) oxide ($Fe_2O_3$), carbon black, perylene red, metal flakes, mixed cobalt and manganese oxides and mixtures thereof.

8. The cooking article according to claim 1, characterized in that said external coating includes at least one additive selected from the group consisting of anti-sedimentation agents, surface control agents and wetting agents.

9. The cooking article according to claim 1, characterized in that said concave internal face of said bilaminate metal dish is covered with an anti-adhesive coating.

10. The cooking article according to claim 9, characterized in that said anti-adhesive coating includes at least one thermostable resin resistant to at least 200° C.

11. The cooking article according to claim 10, characterized in that said anti-adhesive coating has a thickness of between 25 μm and 45 μm.

12. The cooking article according to claim 10, characterized in that said thermostable resin resistant to at least 200° C. is a fluorocarbon resin or a silicone resin.

13. The cooking article according to claim 9, characterized in that said anti-adhesive coating is a sol-gel material.

14. The cooking article according to claim 13, characterized in that said anti-adhesive coating has a thickness of between 20 μm and 60 μm.

* * * * *